July 12, 1927.

J. LOFHOLM 1,635,373

PLASTERING MACHINE

Filed Sept. 21, 1926

Inventor.
John Lofholm
by Heard Smith & Tennant.
Attys.

Patented July 12, 1927.

1,635,373

UNITED STATES PATENT OFFICE.

JOHN LOFHOLM, OF EAST BRAINTREE, MASSACHUSETTS.

PLASTERING MACHINE.

Application filed September 21, 1926. Serial No. 136,750.

This invention relates to a machine for applying plaster or cement to the walls or ceilings of a building and it has for its general object to provide a novel machine for this purpose which is relatively simple in construction but which is effective in operation.

In machines for this purpose it is common to employ a hopper having a flexible delivery pipe connected thereto and means for forcing the plaster, mortar, cement or other similar material from the hopper into and through said delivery pipe so that when the free end of said pipe is manipulated close to a wall or ceiling the plaster or cement which is delivered from the pipe will be applied to the wall or ceiling.

One difficulty which is experienced with plastering machines is the tendency of the delivery pipe to become clogged and one feature of my present invention relates to a novel mechanical means which co-operates with said pipe for forcing the plaster or cement through the latter and preventing it from becoming clogged.

In order to give an understanding of the invention I have illustrated in the drawings a selected embodiment thereof which will now be described after which the novel features will be pointed out in the appended claims.

Figure 1:
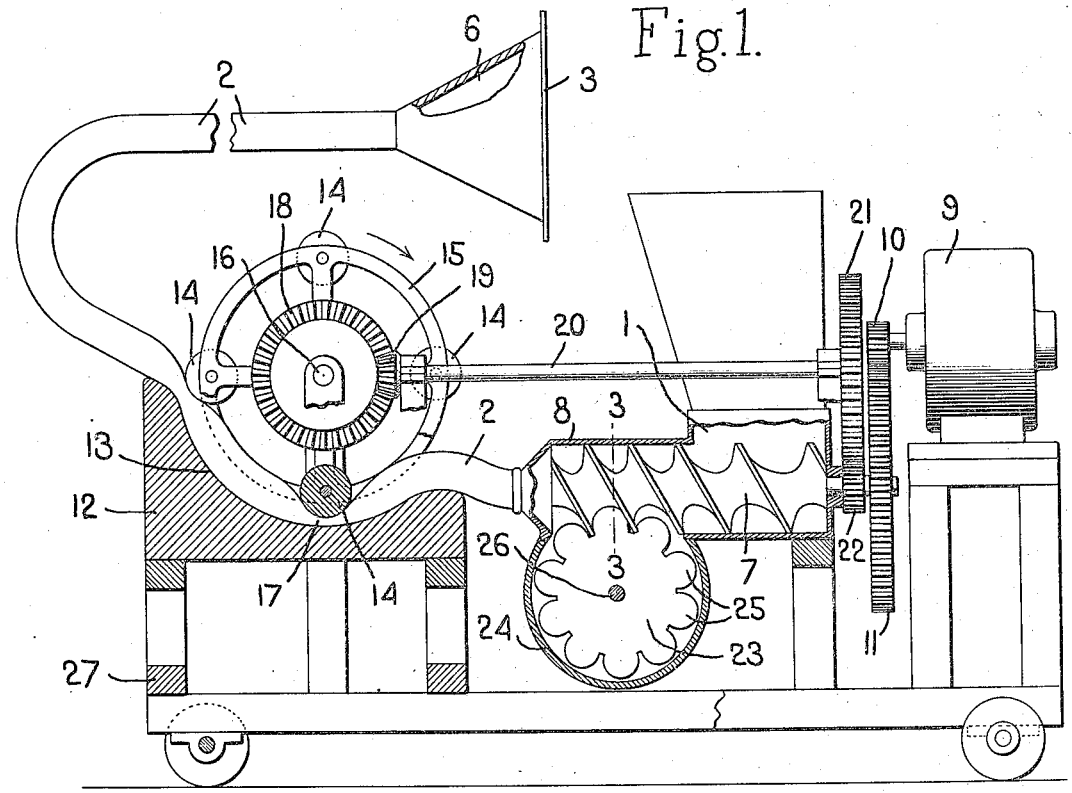
Fig. 1 is a sectional view of a machine embodying my invention.
Figure 2:
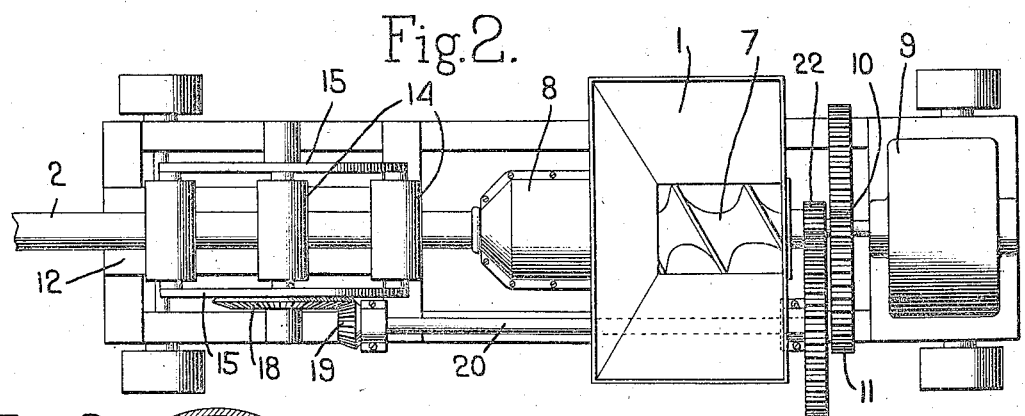
Fig. 2 is top plan view.
Figure 3:
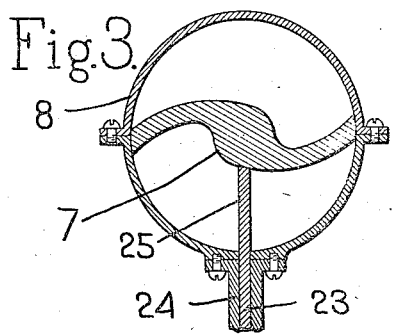
Fig. 3 is an enlarged section on the line 3—3, Fig. 1.
Figure 4:
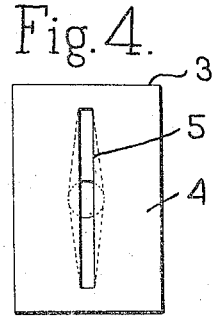
Fig. 4 is a face view of the trowel member at the end of the delivery pipe.

The machine herein illustrated comprises a hopper 1 into which the mortar, cement or other material is delivered and a flexible delivery pipe 2 connected to said hopper and through which the plaster or mortar is delivered to the wall. The end of the delivery pipe 2 is provided with a trowel member 3, the latter having a flat face 4 provided with a delivery slot 5 through which the mortar or plaster is delivered. The trowel member is shown as having a hollow converging portion 6 leading to the slot 5 and with which the end of the flexible pipe 2 communicates.

Means are provided for forcing the plaster or mortar from the hopper through the pipe 2, said plaster or mortar being delivered from the slot 5 in the form of a sheet and by manipulating the trowel member 3 this sheet of plaster may be readily applied to the lathing of the wall or ceiling, the flat face 4 of the trowel member at the same time acting to give a smooth surface to the plaster as it is applied.

The hopper 1 has at its lower end a feed screw 7 by which the plaster is forced into the tube 2, this feed screw working in a cylindrical portion 8 of the hopper. The feed screw may be operated in any appropriate way and I have herein shown for this purpose a motor 9 which is geared thereto, said motor having a pinion 10 on its shaft which meshes with a larger gear 11 fast on the shaft of the feed screw 7.

In order to assist in the feeding of the mortar or plaster through the pipe 2 and to prevent any possibility of its clogging I have provided a mechanical device which co-operates with the tube 2 and acts to positively force the plaster through said tube.

12 indicates a bed member having a curved surface 13 on which a portion of the flexible pipe 2 rests. Co-operating with this bed are a series of rolls 14 which are illustrated as mounted upon a rotating carrier 15 mounted on a shaft 16 that is situated concentrically with the curved surface 13. The rolls 14 are so disposed that as the carrier 15 is rotated each roll will squeeze the tube 2 between itself and the bed 12 to an extent to practically close the tube.

As the carrier 15 is rotated clockwise Fig. 1, or in the direction of the arrow, each roll acts progressively on the tube and thus the point where each roll squeezes the tube together is moved longitudinally of the tube. As a result the mortar or plaster in the tube ahead of the roll is positively forced forward through the tube. The bed 13 will preferably have an extent equal to or greater than the distance between two adjacent rolls so that at least two rolls will be co-operating with the bed at all times. As each roll moves down against the tube and squeezes the tube against the bed as shown at 17 the mortar or plaster which is in the tube between said roll and the roll directly ahead will be trapped between the rolls and as the carrier 15 is rotated and the rolls move forward over the tube this trapped mortar or plaster will be positively fed through the tube. With this mechanism, therefore, all danger that the tube will become clogged due to the friction of the mortar or plaster passing therethrough is prevented and a positive delivery of the mortar or plaster from the trowel member is ensured.

It will be understood, of course, that the tube 2 which is used must be a flexible one which will not be injured by the operation of the rolls 14 thereon.

The action of the feed screw 7 serves to keep the entering end of the tube 2 filled with mortar or plaster and this screw combined with the action of the rolls 14 provides means by which the mortar can be positively forced through the delivery tube.

The rotating carrier 15 may be operated in any suitable way. As herein shown said carrier has a bevelled gear 18 rigid therewith which meshes with and is driven by a bevelled pinion 19 on a shaft 20 said shaft having a gear 21 which meshes with and is driven by a gear 22 on the shaft of the feed screw.

As a means for assisting the feed screw 7 in forcing the material into the tube 2 I have provided a rotating toothed disk 23 which is received in a circular extension or pocket 24 formed on the hopper and which is provided with teeth 25 that fit into the screw portion of the feed screw as seen clearly in Fig. 1. This disk 23 is mounted to rotate freely upon a shaft or support 26 and it is rotated by the rotation of the screw in a manner similar to that in which a gear is actuated by a worm. The teeth of the disk 23 which mesh with the screw act as a dam or partition which prevents the mortar or plaster from rotating around with the screw and compels it to be moved forwardly by the rotation of the screw.

The operative parts which are above described may conveniently be mounted upon a truck 27 which can be readily moved from place to place as occasion requires.

It will be seen from the above that my improved device is very simple in construction and can, therefore, be inexpensively manufactured. Furthermore by the use of the feeding rolls 15 and the disk 23 the mortar or plaster can be positively forced through the tube 2 and delivered to the wall without danger that the tube will become clogged even though it is a relatively long one.

While I have above referred to the machine as being used for applying plaster to a wall yet it can also be used for transporting plaster or mortar from one location to another and may thus do the work of hod carriers in carrying mortar from the place where it is mixed to the tubs that are used by the bricklayers.

I claim:

1. In a plastering machine the combination with a flexible pipe through which plaster or mortar is delivered to a wall, of means for feeding plaster to said pipe, and means acting on the exterior of the pipe to positively force the plaster therethrough.

2. In a plastering machine, the combination with a flexible pipe through which plaster or mortar is delivered to a wall, of means for feeding plaster to said pipe, and means acting on the exterior of the pipe progressively in the direction of its length to positively force the plaster therethrough.

3. In a machine of the class described, the combination with a flexible pipe through which the plaster or mortar is delivered to a wall, means to feed plaster or mortar into said pipe, and pipe squeezing means acting on the pipe progressively in the direction of its length for forcing the plaster or mortar therethrough.

4. In a device of the class described, the combination with a flexible pipe through which plaster or mortar is delivered to a wall, of means to feed the plaster to said pipe, a bed on which the pipe rests, and means co-operating with said bed to squeeze the pipe progressively in the direction of its length thereby to force the plaster or mortar through the pipe.

5. In a device of the class described, the combination with a flexible pipe through which plaster or mortar is delivered to a wall, of means to feed the plaster to said pipe, a curved bed on which the pipe rests, a rotary member and rolls carried thereby and movable longitudinally of the bed as the said member rotates, said rolls operating to squeeze the pipe progressively in the direction of its length thereby to force the plaster or mortar therethrough.

6. In a device of the class described, the combination with a hopper to receive plaster, said hopper having a cylindrical portion and a circular extension below the cylindrical portion, said extension being provided with a circular chamber having a relatively small transverse dimension, of a delivery pipe connected to the end of the cylindrical portion of the hopper, a feed screw operating in said cylindrical portion for feeding plaster to said delivery pipe, and a freely rotatable disk in the chamber of said extension, said disk having teeth which mesh with the feed screw.

In testimony whereof, I have signed my name to this specification.

JOHN LOFHOLM.